United States Patent
Kuno et al.

(10) Patent No.: US 7,970,866 B2
(45) Date of Patent: *Jun. 28, 2011

(54) PRINT SYSTEM INCLUDING APPLICATION SERVER TO SELECT PRINTER DRIVER FOR CLIENT SPECIFIC PRINT INFORMATION

(75) Inventors: Takatsugu Kuno, Aichi-Ken (JP); Yoshiyuki Tamai, Itami (JP); Tomokazu Kato, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 863 days.

This patent is subject to a terminal disclaimer.

(21) Appl. No.: 10/329,577

(22) Filed: Dec. 27, 2002

(65) Prior Publication Data

US 2003/0135549 A1 Jul. 17, 2003

(30) Foreign Application Priority Data

Dec. 28, 2001 (JP) .................................. 2001-401326

(51) Int. Cl.
*G06F 15/16* (2006.01)
*G06F 15/173* (2006.01)
*G06F 15/00* (2006.01)
*G06F 3/12* (2006.01)

(52) U.S. Cl. ..... 709/219; 358/1.15; 358/1.14; 358/1.16; 358/1.13; 719/327

(58) Field of Classification Search .......... 709/200–203, 709/217–230, 244; 358/1.13, 1.16, 434, 358/402, 1.1, 1.14, 1.15; 718/100, 104, 105; 719/310, 311, 317, 318, 327; 700/227; 708/173
See application file for complete search history.

(56) References Cited

U.S. PATENT DOCUMENTS

| | | | | |
|---|---|---|---|---|
| 6,301,012 B1 * | 10/2001 | White et al. | .................. | 358/1.15 |
| 6,327,579 B1 * | 12/2001 | Crawford | ...................... | 705/400 |
| 6,378,070 B1 | 4/2002 | Chan et al. | | |
| 6,542,173 B1 * | 4/2002 | Buckley | ........................ | 715/841 |
| 6,623,527 B1 * | 9/2003 | Hamzy | ......................... | 715/513 |
| 6,631,418 B1 * | 10/2003 | Watkins | ....................... | 709/231 |
| 6,954,229 B1 * | 10/2005 | Otala | ....................... | 348/231.99 |
| 7,019,861 B2 * | 3/2006 | Aagesen | ...................... | 358/1.15 |
| 7,047,551 B2 * | 5/2006 | Ogawa et al. | ................. | 725/141 |
| 7,441,003 B1 * | 10/2008 | Takeda et al. | ................ | 709/206 |
| 2002/0046101 A1 * | 4/2002 | Ogawa et al. | .................. | 705/14 |
| 2002/0051164 A1 * | 5/2002 | Watanabe et al. | ............ | 358/1.13 |
| 2002/0054339 A1 * | 5/2002 | Arakawa | ....................... | 358/1.15 |
| 2002/0065873 A1 * | 5/2002 | Ishizuka | ....................... | 709/203 |
| 2002/0078160 A1 * | 6/2002 | Kemp et al. | ................... | 709/208 |
| 2002/0140971 A1 * | 10/2002 | Machida | ...................... | 358/1.15 |

(Continued)

FOREIGN PATENT DOCUMENTS

JP 09-152947 6/1997

(Continued)

*Primary Examiner* — Haresh N Patel

(74) *Attorney, Agent, or Firm* — Buchanan Ingersoll & Rooney PC

(57) ABSTRACT

In a print system, an application server holds an application program. A client computer uses the application program, and data obtained by the application program is printed by a printer. The server acquires a printer driver according to the client information. The application program obtains print data by using the printer driver and sends the print data to the client computer or the printer. Thus, the application program automatically changes the printer driver according to the client information or user.

4 Claims, 4 Drawing Sheets

U.S. PATENT DOCUMENTS

| | | | |
|---|---|---|---|
| 2002/0169858 A1* | 11/2002 | Bellinger et al. | 709/220 |
| 2002/0174150 A1* | 11/2002 | Dang et al. | 707/536 |
| 2002/0174264 A1* | 11/2002 | Fuller et al. | 709/321 |
| 2002/0181010 A1* | 12/2002 | Pineau | 358/1.15 |
| 2003/0004882 A1* | 1/2003 | Holler et al. | 705/51 |
| 2003/0007175 A1* | 1/2003 | Tsuda et al. | 358/1.15 |
| 2003/0065755 A1* | 4/2003 | Gunji | 709/221 |
| 2003/0098993 A1* | 5/2003 | Ohara | 358/1.15 |
| 2003/0117638 A1* | 6/2003 | Ferlitsch | 358/1.13 |
| 2003/0135549 A1* | 7/2003 | Kuno et al. | 709/203 |
| 2004/0054717 A1* | 3/2004 | Aubry et al. | 709/203 |
| 2004/0057075 A1* | 3/2004 | Stewart et al. | 358/1.15 |
| 2004/0080779 A1* | 4/2004 | Kawamoto | 358/1.14 |
| 2004/0205449 A1* | 10/2004 | Hayes | 715/500 |
| 2006/0072156 A1* | 4/2006 | Shima | 358/1.15 |

FOREIGN PATENT DOCUMENTS

| | | |
|---|---|---|
| JP | 10-097396 | 4/1998 |
| JP | 10-235974 | 9/1998 |
| JP | 2000-035869 | 2/2000 |
| JP | 2000-132378 | 5/2000 |
| JP | 2000-267831 | 9/2000 |
| JP | 2000-330734 | 11/2000 |
| JP | 2000-353059 | 12/2000 |

* cited by examiner

PRINT SYSTEM INCLUDING APPLICATION SERVER TO SELECT PRINTER DRIVER FOR CLIENT SPECIFIC PRINT INFORMATION

This application is based on application No. 2001-401326 filed in Japan, the contents of which are hereby incorporated by reference.

BACKGROUND

The present invention relates to a print system including an application service provider.

Recently, a service model called an application service provider (ASP) becomes popular. In a print system using an application service provider, application programs are stored in an application server that can be accessed through the Internet. When one of the application programs is needed, a client computer gets the application program from an application server and executes it. The data obtained is sent to and printed by a printer.

When data obtained by the application program in the application server is printed, the data is converted to a general format such as hypertext markup language (HTML) so that it can be displayed by a browser in the client computer. A printer driver for the client computer receives and converts the data with a print description language (PDL) and sends the PDL data to a printer for the client computer. However, information that cannot be displayed by the browser cannot be printed. For example, image data having a high resolution may not be printed at the high resolution. Therefore, it is preferable that the application program in the application server generates print data.

Though it is preferable that an application program in the application server generates print data, if the application program is not activated, it cannot make the print data. Therefore, when data made by the application program is printed out, a client computer gets the application program from the application server, activates the application program to make print data of the application program. Next, a printer driver generates print data and sends it to a printer.

However, application programs held in the application server include, besides software programs such as a word processor or a spreadsheet of smaller data sizes, many management software programs not used frequently by a business user such as group wares for personnel management, financial management, data management such as data warehouse, of a larger data size. Then, if such an application program of larger data size is get by a client computer only for printing the data, it will take a long time for the processing and a longer time until print out thereof. Further, it is a problem that the client computer is not freed for a long time for getting the application program and for sending the print data to a printer. Further, the processing load in the application server increases due to increase in transmission times because for each printing the application program is sent to a client and sent back just after the print data is generated. Further, because a printer has a status varying with time, printing may not be possible when a print job is received. For example, if many print jobs are reserved, when a new job is transmitted, a print out may not be possible. This is ascribable to an error status or a status when another print job from a different client computer is being received. In such a case, when the application server accesses the printer though the Internet, the printer cannot accepts a job, so that it may reject to receive the job. This is unproductive access from the application server.

In order to solve these problems, it may be suggested to generate print data in the application server and send it to a printer. However, a printer has information on the configuration thereof inherent for each setting site such as default paper cassette, available paper sizes discharge option, and the like. In a network environment wherein the application server and a printer communicate through the Internet, the application server does not know the above-mentioned configuration information on the printer for the client. Thus, it is difficult to generate control information in correspondence to the configuration information on the printer (not dependent on the application program). Further, print control information according to the printer configuration information may be set for each client. For example, as to a printer wherein a print of 1200 dots per inch (dpi) can be outputted, a client may set print mode at 600 dpi as default mode, but another client may set print mode of 400 dpi as default mode. If print control information such as output resolution is different when an application program generates print data, it is a problem that print data cannot be generated according to the print control information requested by the client. Therefore, a printer server for a printer requested by a client for printing may not be kept in the application server.

In a network print system disclosed in Japanese Patent laid open Publication 2000-330734, a fire wall exists between a hypertext transfer protocol (HTTP) server and a client computer, so that data cannot be sent directly from the server to the printer. In order to remove the limitation due to the fire wall in this environment, mode setting and conversion to a page description language are performed in the client side, and the mode setting information and the print data are transmitted to a printer. In this transmission, a format recognized by the server is adopted, and the server sends the print data to which printing is requested. On the contrary, in the invention explained below, the server performs conversion to a page description language. Further, the above-mentioned server manages protocols, but the invention relates to a server managing application programs. In a printer disclosed in Japanese Patent laid open Publication 2000-132378, the printer sends a printer driver therefor to a host in a network. The printer recognizes an operation system of the host and sends an appropriate driver to the host.

SUMMARY OF THE INVENTION

An object of the present invention is to perform printing efficiently in a network environment including an application service provider.

In one aspect of the invention, a print system includes a server holding an application program, a client computer and a printer connected through a network. The client computer comprises an input unit which receives a print request by a user on application data obtained by the application program held by the server, and a transmitter which transmits client information and the print request through the network to the server. In the server, an acquisition device acquires a printer driver according to the client information, and a data processor obtains print data with a print driver according to the client information, the print driver being activated in the activated application program, and sends the print data to the client computer or the printer. Further, the printer comprises an input device which receives the print data from the server. Thus, the application program automatically changes the printer driver according to the client information or user.

In another aspect of a print system of the invention, a client computer sends client information and printer driver information to a server holding application programs, while the server registers the printer driver information according to the client information.

An advantage of the present invention is that because a printer driver suitable for the user's environment can be provided, printing can be performed according to the ability of the printer.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
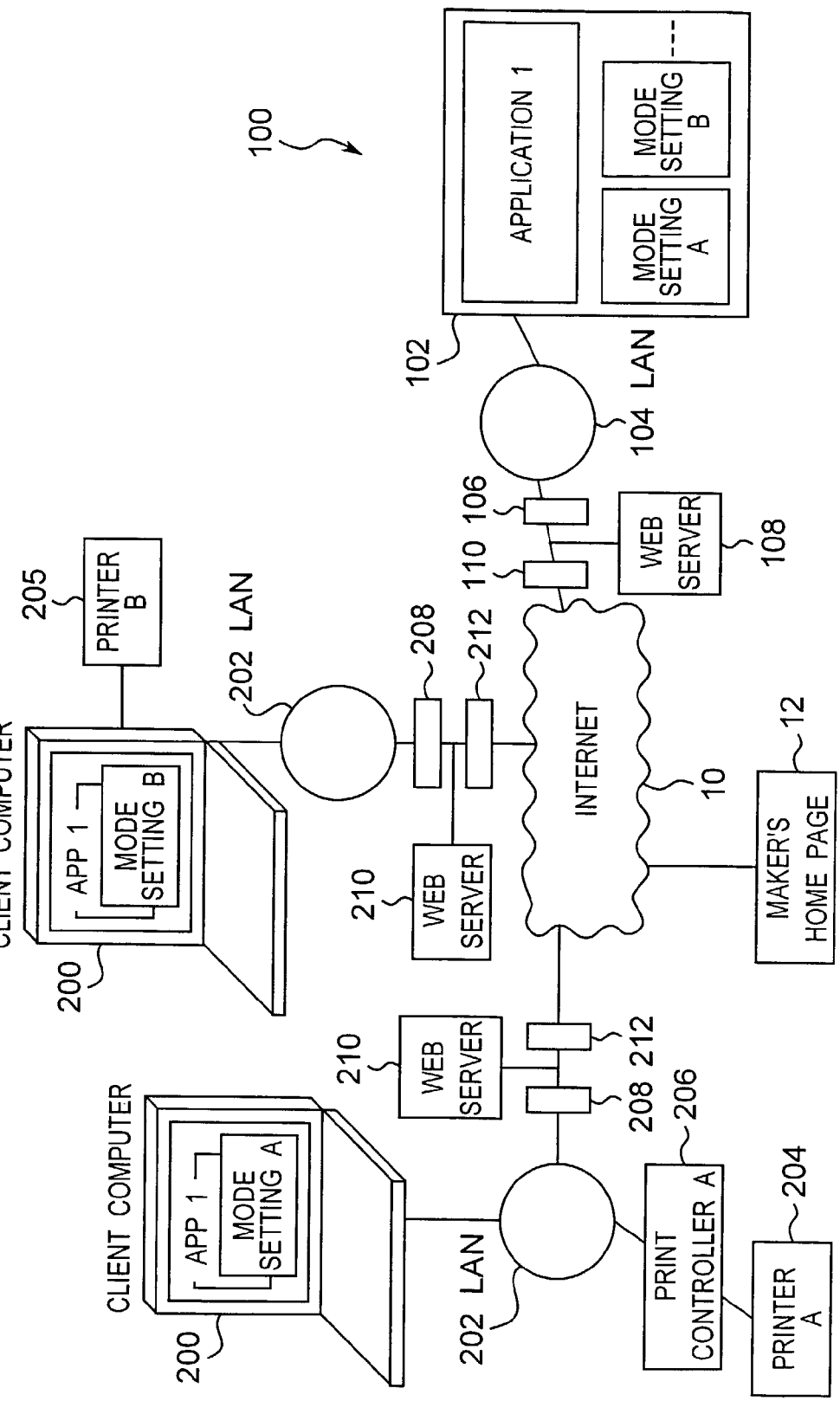
FIG. 1 is block diagram of a system including an application server.

Referring now to the drawings, wherein like reference characters designate like or corresponding parts throughout the several views, FIG. 1 shows a system including an application service provider (ASP) 100, which is connected to a client computer 200 through a network. The application service provider 100 includes application programs. A client computer 200 can request the application service provider 100 to provide print data by executing one of the application programs. The obtained data is printed by printers 204, 205. Many client computers 200 will be connected to the application service provider 100, but for the simplicity of explanation, only two client computers 200 are shown in FIG. 1.

This system is explained further in detail. The application service provider 100 includes a computer as an application server 102. In order to communicate with the client computer 200 or a printer controller 206, the application server 102 is connected through a local area network (LAN) 104, a fire wall device 106 and a router 110 to the Internet 10. Further, a web server 108 in the application service provider receives an access request to the application server 102 from a client computer 200 and executes a requested service.

When print data is sent, the application server 102 converts the print data obtained by the application program to a printer language and sends the converted print data to a printer controller 206 in the client side directly or through a client computer 200. In this type of printing, a printer driver is uploaded from the client side, and the print data are obtained by using the printer driver. The printer driver used by the application server 102 is changed for each user or for each client computer.

On the other hand, in the client side, a client computer 200 is connected through a local area network (LAN) 202 to the print controller 206 connected to the printer 204. The printer controller 206 receives a print request from the client computer 200 and sends the print data received from the client computer 200 to the printer 204. The printer 204, having a print engine and a controller therefor, prints the received print data. It is to be noted that the printer 204 may be a printer integrated with a print controller. The printer 205 is connected to the other client computer 200. In the following explanation, even when print data is sent indirectly through a printer controller or a client computer, it may be expressed that data is sent to a printer.

The client computer 200 and the printer controller 206 are connected through LAN 202 and further through a fire wall device 208, a web server 210 and a router 212 to the Internet 10. The fire wall device 208 has functions such as packet filtering and proxy and passes only packets that satisfy predetermined conditions on IP address of mail source (host name), IP address of destination (host name), port number of mail source, port number of destination and data. Thus, only such packets are sent through the Internet to the printer controller 206. In a transmission from an intranet to the Internet or in an access from a printer in the intranet to an application server, a reply transmission therefor is permitted when signals are transmitted from the application server to the printer. The router 212 controls routing.

In this system, a user of a client computer 200 connects it to the application server 102 and requests to activate an application program (ASP application program). When the application server 102 receives the request, it identifies the user and activates the requested application program to provide a user interface therefor. Thus, the application program is provided on-line in parallel according to a request from users. Data obtained by the application program is usually stored in a hard disk 13 in the application service provider.

When a user wants to print the data obtained by the application program, he or she registers a printer type to be used to the application server 102. A printer used for printing the data obtained by the application program may be a printer 205 connected locally to the client computer 200 or a network printer 204 registered for the network. If a user already registers a printer to be used before obtaining print data, a printer driver may be changed automatically according to the user.

When the application server 102 receives a print request from a user, a printer that has been related to the user uses a printer driver registered and makes print data. Then, it sends the print data through the printer controller 206 or a client computer 200 to the printer 204, 205. When the application server 102 does not have a printer driver that can be used by the printer designated by the user, it can request to get the printer driver to the user. Then, the printer driver is sent from the client computer. It may be gotten by searching a uniform resource locator (URL) or the like in a network, based on the printer information received from the user. The obtained print date may be sent to a printer or a URL in the network.

Preferably, printer information in correspondence to a location of a user such as IP address is registered. When a request for making print data by a user is received, the user's location is decided, and print data are obtained by using a printer driver in correspondence to the user's location.

Figure 2:
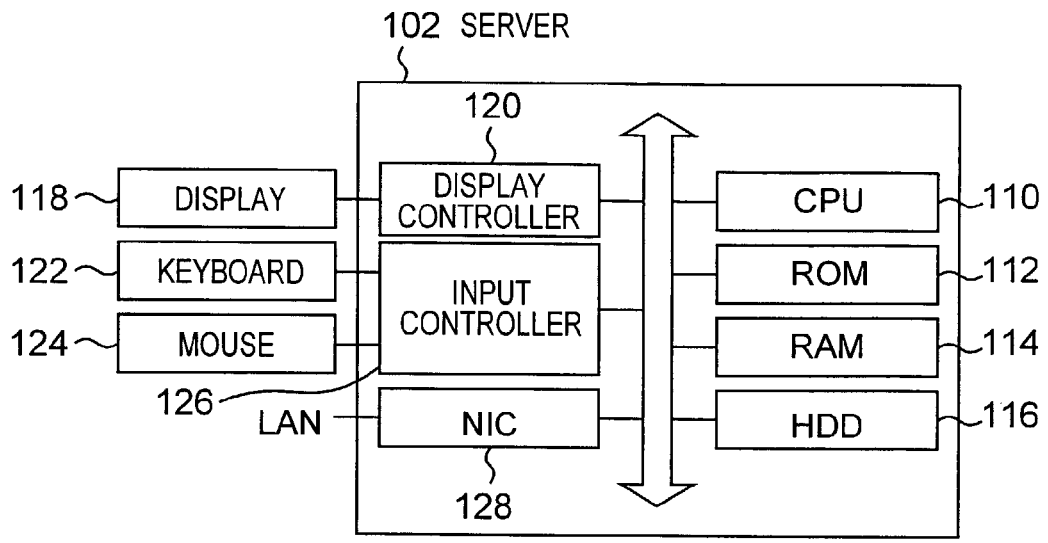
FIG. 2 is a block diagram of the application server.

The apparatuses included in the above-mentioned system are explained below in detail. FIG. 2 shows a structure of a computer as the application server 102 provided in the application service provider. The application server 102 has a central processing unit (CPU) 110, a read only memory (ROM) 112, a random access memory (RAM) 114 and a hard disk drive 116, and it is also connected through a display controller 120 to a display device 118 and through input controllers 126 to a keyboard 122 and to a mouse 124. Further, it is connected to a network interface card 128 for data transmission through LAN 104. The hard disk drive 116 stores registered information of client computers 200 including identification data for access of client computers 200 to the application server 100, e-mail addresses of client computers 200, files of application names and application data, addresses of printers used by clients, model names of printers, and names of printer drivers. Further, it stores application programs, application data and printer drivers activated by a print request from a client and different for each client. The registered information of the client computer 200 is stored in folders (or directories) in the hard disk drive 116 so that it can be rewritten and read easily.

In the application server 102, a printer driver makes print job data for application data obtained by application programs. When a print request is received from a client computer 200 through the Internet 10, a printer driver is activated to make print data with print image data described with a page description language (PDL). The print data is sent to a printer designated by the client computer 200. Generally a plurality of page description languages are used, but a page description language that can be interpreted by the printer controller 206 is used.

The printer driver makes print data that can be interpreted by the printer controller. When the printer driver is activated, a user interface for operation is displayed in a screen of the display device 118. A request from the client computer 200 is accepted through the Internet, and the application data is converted to print image data of a page description language, so that the application data stored by the application program are converted to data that can be interpreted by the printer controller 206. The printer driver issues a request of print job to a printer designated by the client computer 200 and sends the print data.

Figure 3:
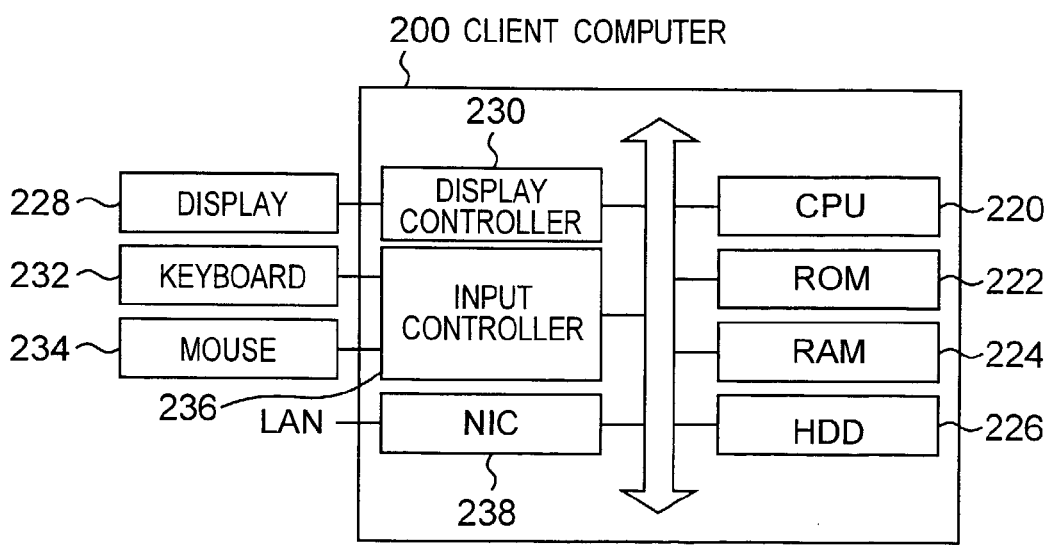
FIG. 3 is a block diagram of a client computer.

FIG. 3 shows a client computer 200. The client computer 200 has a central processing unit (CPU) 220, a read only memory (ROM) 222, a random access memory (RAM) 224 and a hard disk drive 226, and it is also connected through a display controller 230 to a display device 228 and through input controllers 236 to a keyboard 232 and to a mouse 234. Further, it is connected to a network interface card 238 for transmission of data through LAN 202. The ROM 222 and the hard disk drive 226 store a program for access to the application server, a program for getting an application program and application data from the application server, a program for requesting, to make print data to the application server, and a printer driver. The ROM 222 and the hard disk drive 224 also store an e-mail address (URL) of the application server and identification data for access to the application server.

Figure 4:
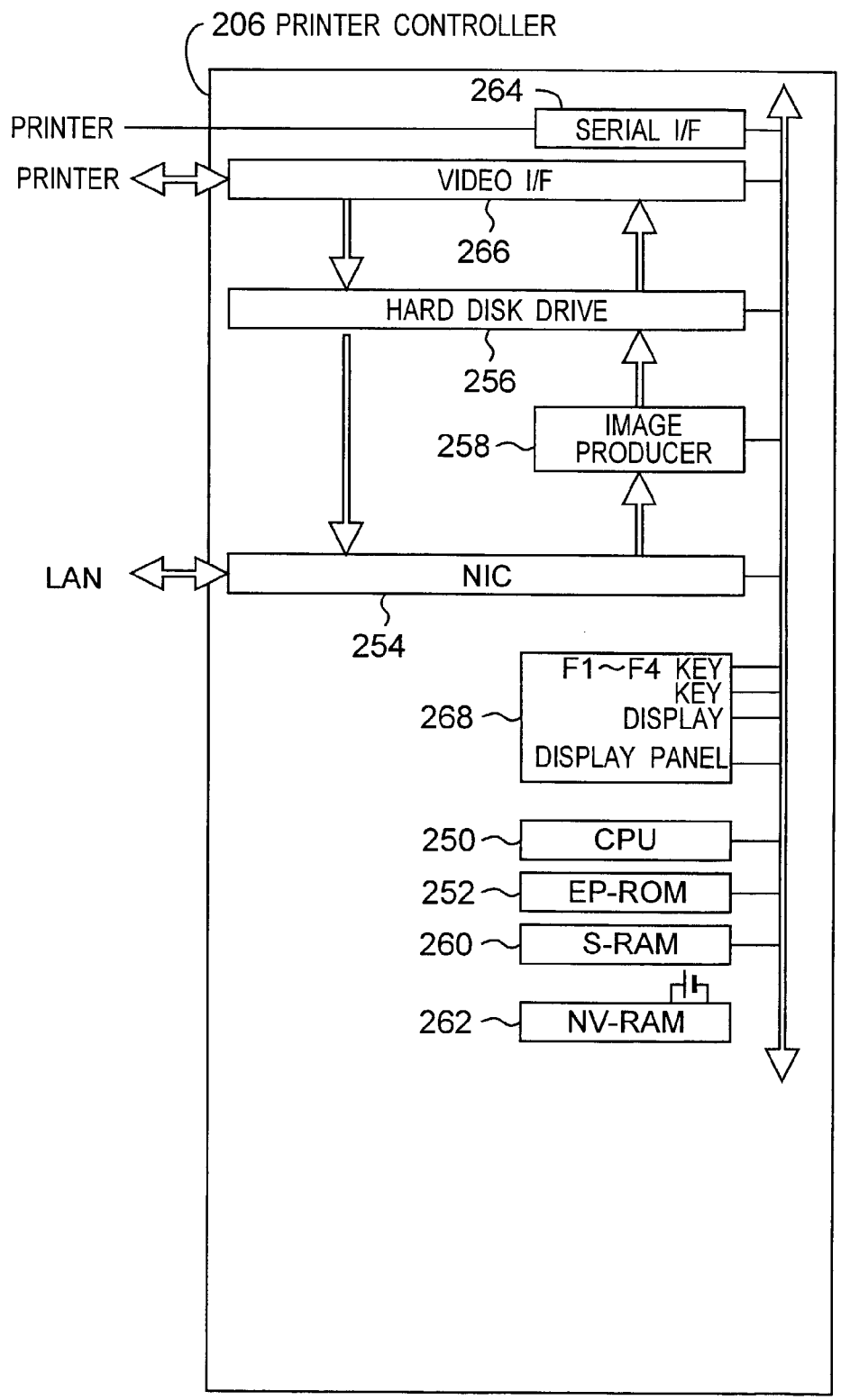
FIG. 4 is a block diagram of a printer controller.

FIG. 4 shows the printer controller 206. In the printer controller 206, a central processing unit (CPU) 250 receives print jobs from the client computers 200, manages the jobs, manages a firmware or ROM, manages image processing of print images, converts data of image information received with an e-mail, converts data of image information to be sent with an e-mail, and manages rewrite of the firmware. An electrically programmable ROM (non-volatile memory) 252 stores control programs for the above-mentioned processings. A network interface card 254 sends and receives various data through LAN, such as print jobs from the client computers 200 and image information to other printers. A hard disk drive (non-volatile memory) 256 stores print jobs received from the client computers 200 and jobs for sending image information. In an image producer 258, an interpreter converts the print data of a print job described in a page description language to intermediate codes, a font memory stores font information and font data for analyzing the intermediate codes, a random access memory (RAM) stores bit map data derived from the intermediate codes, and an image processor sends the bit map data to the RAM. A static random access memory 260 is used as a work area. A non-volatile random access memory 262 back-upped with a battery stores various setting values and management information. The non-volatile memory 262 stores an e-mail address (URL) and a password besides IP address thereof. The printer controller 206 is further connected through a serial interface 264 and a video interface to a serial interface and a video interface of the printer. Further, the printer controller 206 has an operation panel 268 for various operations.

Figure 5:
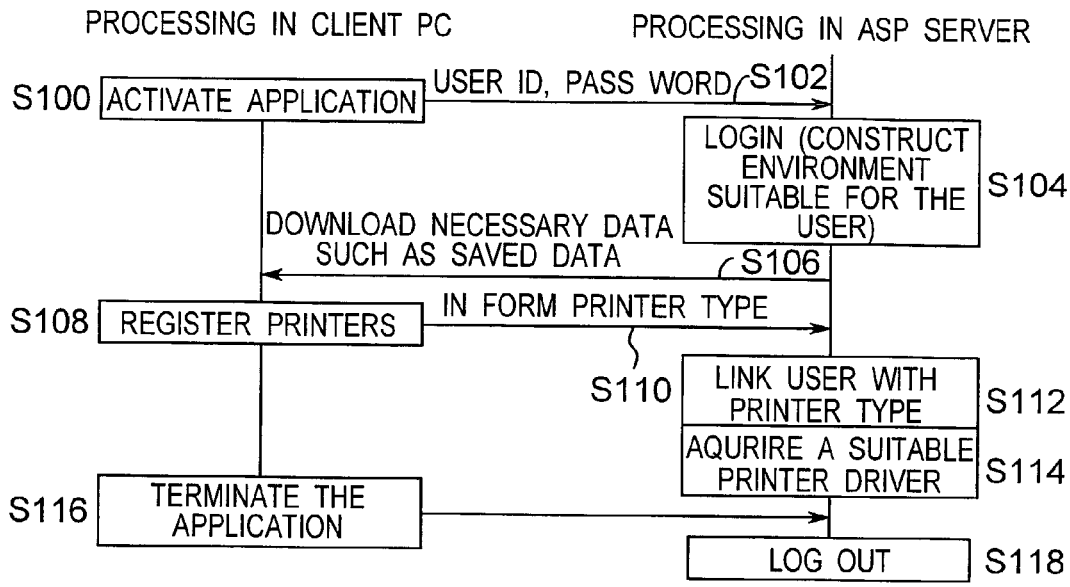
FIG. 5 is a sequence chart of a client computer and an application server when a printer is registered.

FIG. 5 shows a sequence chart of the client computer 200 and the application server 102 when a printer is registered. First, a user at the client computer 200 activates an application program (S100), and the client computer 200 sends user ID and a password to the application server (S102). Then, the application server 102 activates the application program and constructs an environment suitable for the user (S104). Next, it sends stored application data or the like to the client computer 200 (S106). The user registers a printer that he or she wants to use (S108) and informs printer type to the application server 102 (S110). The application server 102 has a table that relates printer names to locators of printer drivers and relates the user to the printer information based on the table (S112). Further it installs the printer driver suitable to the designated printer (S114). If the printer driver is not held in the application server 102, it may be requested to the user. Further, it may also be gotten from a home page 12 of a designated maker or the like. The install of the printer driver can be performed when a print request is received. Then, the user terminates the application program (S116), and the application server 102 performs log-out processing (S118). The processings of the client computer 200 and the application server 102 correspond to the flow shown in the right and left sides in FIG. 5, and for the brevity of explanation, it is not explained here.

Figure 6:
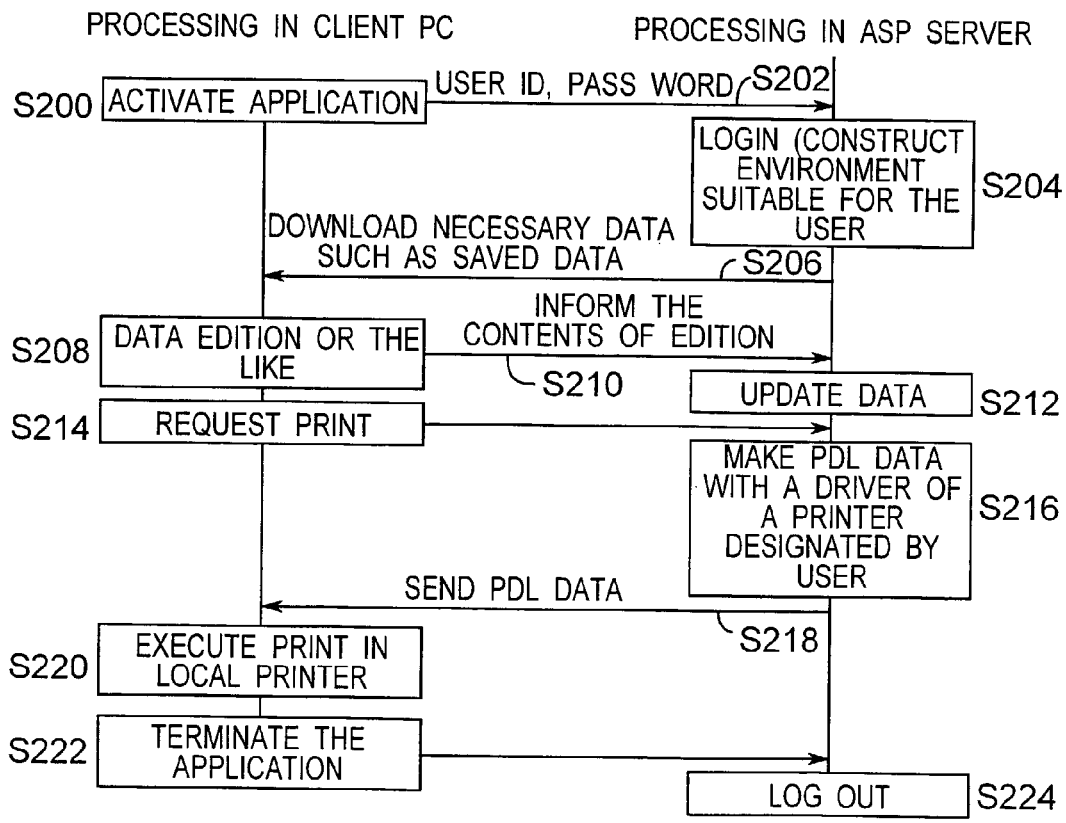
FIG. 6 is a sequence chart of a client computer and an application server when printing is performed.

FIG. 6 is a sequence chart of the client computer 200 and the application server 102 when printing is performed. First, a user at the client computer 200 activates an application program (S200), and the client computer 200 sends user ID and a password to the application server (S202). Then, the application server 102 activates the application program and constructs an environment suitable for the user (S204). Data obtained by the application program are stored. Next, it sends the stored data or the like to the client computer 200 (S206). The user edits data generated after download (S208), and it informs printer type to the application server 102 (S110). The application server 102 has a table that relates a printer name to a locator of printer drivers and relates the user to the printer information based on the table (S112). Further it installs the printer driver suitable to the designated printer if necessary (S114). The contents of the edition are informed to the server 102 at appropriate timings (S210), and the server 102 updates the stored data (S212). Next, when a user requests printing (S214), the application server 102 that receives the print request makes PDL data by using a printer driver suitable for the registered printer designated by the user (S216), and it sends the PDL data to the client computer 200 (S218). If the user has not yet registered printer information, the registration is requested to the user. The client computer 200 that receives the PDL data sends it to the local printer 205 and performs printing (S220). Then, the user terminates the application program (S222); and the application server 102 performs log-out processing (S224). The processings of the client computer 200 and the application server 102 correspond to the flow shown in the right and left sides in FIG. 6, and for the brevity of explanation, it is not explained here.

In the above-mentioned example, printing is performed by a local printer for the client computer 200. However, the application server 102 may send the PDL data made by the application server 102 to a network printer 204 that can be accessed directly by the application server 102.

It is also possible to use a different printer according to user's location even though the same user ID is used, for example, by informing data on the user's location included in the user information when the application program is activated.

The above-mentioned system has following advantages.

In the above-mentioned system wherein application programs are held in a server, when data of one of the application programs is printed, the print data can be provided by acquiring or selecting a printer driver different for each user. Therefore, a printer driver according to print environment in the client computer can be provided to the application server, so that the application server can make print data according to the performance of a printer.

In a print system wherein a printer driver is uploaded to a server and the server converts the data of the application program to print data, printing is possible according to the performance of the printer in the client side.

In contrast to a system wherein a client sends print data to a printer after the client receives the application program, it can be omitted to send the application program to the client computer. Thus a time until print out can be shortened.

Because print data can also be generated in the application server, the print request, the transmission of print data and the storage of the print data are not performed at different locations. Then the efficiency of communication and processing is improved.

Because a printer driver different for each user is sent to the application server when print is requested, print data is generated with the printer driver, it becomes possible to obtain print data with a printer driver different for each client.

When a printer driver is not held in the application server, it is not needed to get the printer driver.

In a network environment wherein a printer exists in the same local area network as a client computer so that the application server and the printer communicates with each other through the network, the application server can get or read a printer driver according to client information. Therefore, print data can be obtained according to the print environment of the user by using a printer driver different for each client.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A print system in which an application server holding an application program, a client computer, and a printer exist in a same local area network and are connected through a network including a fire wall and the Internet to the application server, the application program being activated in the application server and creating application data on the application server by a user's operation from the client computer,
the client computer comprising:
an input unit, which receives a print request from the user for the application data that is created by the application program on the application server;
an informing unit which informs printer driver information to the application server; and
a transmitter, which transmits client information and the print request through the network to the application server;
the application server comprising:
a register which registers the printer driver information informed by the informing unit so as to relate the printer driver information to the client information;
an acquisition device, which upon receipt of the print request acquires a printer driver corresponding to the printer driver information for the received client information externally of the application server; and
a data processor, which activates the printer driver acquired by the acquisition device in the application server, creates print data for the application data with the printer driver and sends the print data to the client computer or directly to the printer, in response to the print request; and
the printer comprising:
an input device, which receives the print data sent from the application server.

2. A print system in which an application server holding an application program, a client computer and a printer exist in a same local area network and are connected through a network including a fire wall and the Internet to the application server, the application program being activated in the application server and creating application data on the application server by a user's operation from the client computer,
the client computer comprising:
an input device, which receives an activation request from the user to activate the application program in the application server; and
a transmitter, which, in correspondence to the activation request of the user in the client computer, transmits the activation request, client information, and printer driver information to be registered according to the client information, from the client computer through the network to said application server;
the application server comprising:
a communication device which gets the activation request of the application program, the client information, and the printer driver information;
a register which registers the printer driver information according to the client information;
an acquisition device which acquires a printer driver externally of the application server according to the registered printer driver information when a print request is received; and
a data processor which activates the printer driver acquired by the acquisition device in the application server, the printer driver creates print data for the application data, and the created print data is sent to the printer, in response to a print request from the client computer.

3. A print system in which an application server holding an application program, a client computer and a printer are connected through a network, the application program being activated in the application server and creating application data on the application server by a user's operation from the client computer,
the client computer comprising:
an input unit which receives a print request from the user for the application data that is created by the application program on the application server;
an informing unit which informs printer driver information to the application server; and
a transmitter, which transmits client information and the print request through the network to the application server;
wherein the printer driver information corresponds to a printer type of the printer,
the application server comprising:

a register which registers the printer driver information informed by the informing unit so as to relate the printer driver information to the client information;

an acquisition device, which upon receipt of the print request acquired a printer driver corresponding to the printer driver information for the received client information externally of the application server; and a data processor which activates the printer driver acquires by the acquisition device in the application server, creates print data for the application data with the printer driver and sends the print data to the client computer or directly to the printer, in response to the print request; and the printer comprising:

an input device which receives the print data sent from the application server.

4. A print system in which an application server holding an application program, a client computer and a printer are connected through a network, the application program being activated in the application server and creating application data on the application server by a user's operation from the client computer, the client computer comprising:

an input device, which receives an activation request from the user to activate the application program in the application server; and a transmitter, which, in correspondence to the activation request of the user in the client computer, transmits the activation request, client information, and printer driver information to be registered according to the client information, from the client computer through the network to the application server;

where the printer driver information corresponds to a printer type of the printer, the application server comprising:

a communication device which gets the activation request of the application program, the client information, and the printer driver information;

a register which registers the printer driver information according to the client information;

an acquisition device which acquires a printer driver externally of the application server according to the registered printer driver information when a print request is received; and a data processor which activates the printer driver acquired by the acquisition device in the application server, the printer driver creates print data for the application data, and the created print data is sent to the printer, in response to a print request from the client computer.

* * * * *